Oct. 11, 1955  A. W. TRONNIER  2,720,139
FOUR-MEMBERED PHOTOGRAPHIC OBJECTIVE
Filed Feb. 26, 1954  2 Sheets-Sheet 1

INVENTOR
ALBRECHT WILHELM TRONNIER
BY Mock & Blum
ATTORNEYS

Oct. 11, 1955   A. W. TRONNIER   2,720,139
FOUR-MEMBERED PHOTOGRAPHIC OBJECTIVE
Filed Feb. 26, 1954   2 Sheets-Sheet 2

INVENTOR
ALBRECHT WILHELM TRONNIER
BY Mock + Blum
ATTORNEYS

United States Patent Office 2,720,139
Patented Oct. 11, 1955

2,720,139
FOUR-MEMBERED PHOTOGRAPHIC OBJECTIVE

Albrecht Wilhelm Tronnier, Gottingen, Germany, assignor to Voigtländer A. G., Braunschweig, Germany, a corporation of Germany Application February 26, 1954, Serial No. 412,825

Claims priority, application Germany February 27, 1953

5 Claims. (Cl. 88—57)

This invention relates to photographic objectives of high light-transmitting capacity, of a four-membered modification of the Gauss-type and has particular relation to objectives of this type, which are corrected spherically, chromatically, for coma and astigmatically and have a large effective field of vision.

In objectives embodying the present invention, which form a specific variation of the Gauss-type, the front member preceding the diaphragm on the side of the major conjugate, consists of a meniscus-shaped collecting lens, which is convex relative to said conjugate and a diverging member which follows said collecting lens in the direction toward the diaphragm and consists of lenses of opposite power, the outer contour of said member having likewise the shape of a meniscus which is convex relative to the major conjugate; the diaphragm is followed, on the side of the minor conjugate, by a rear member consisting of two uncemented lenses, one of the latter being a meniscus, which is concave relative to the diaphragm and is of dispersing refraction power, while the subsequent last element of the total objective system is a collective lens of unequal curvature.

Five-membered Gauss-type modifications of this character, have been suggested previously. The objectives according to these previous suggestions had either a large effective field of vision of about 50° at medium relative apertures of about 1:3 up to 1:2.8, or only a small field of vision of about 35° in the modifications of high light-transmitting capacity, the relative aperture of which is 1:2.

It is the main object of the present invention to provide improved photographic objectives, in which high light-transmitting capacity, large effective field of vision, and simple design and construction are for the first time realized simultaneously.

The conventional means of obtaining an increase of light-transmitting capacity by designing the collective lens adjacent the minor conjugate on the image side, which consists preponderantly of glass of heavy refractive power, plainly, or even with equal curvature, as a biconvex lens, cannot lead to a solution of the problem, in view of the simultaneous decrease of the effective field of vision, as evidenced by objectives according to the above mentioned previous suggestions.

According to the present invention, the above mentioned object of high light-transmitting capacity combined with large effective field of vision, is fully attained by a novel manner of arranging the refractive surfaces near the diaphragm in the direction to the side of the minor conjugate.

Figure 1:
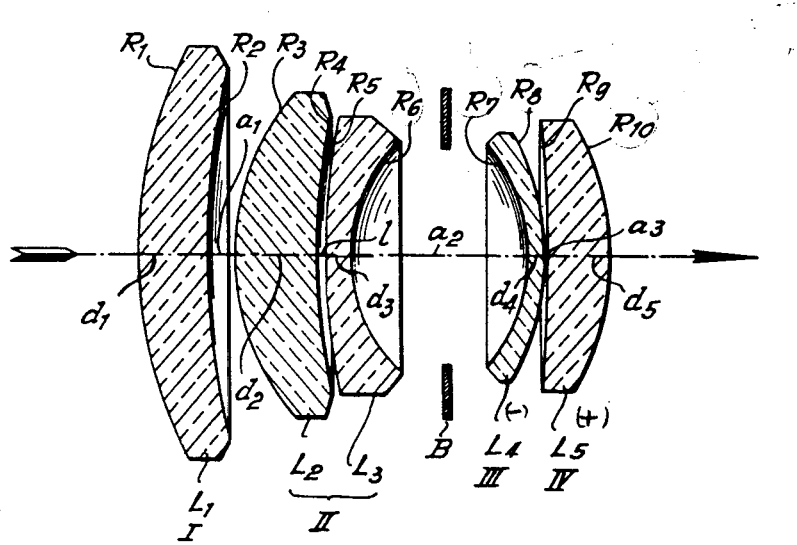
Figure 1 shows a preferred form of the objective of the invention.

From a strictly optical point of view, the construction principle of the present invention consists in a novel arrangement and/or distribution of the characteristic refractive effects on said side near the diaphragm, turned away from the major conjugate, of the total objective. This novel arrangement and distribution of the refractive effects, each of which is brought about by a proper refractive surface of the system, has thus to do on the one hand with the arrangement of the two characteristic diverging surfaces ($R_6$ and $R_7$) of lenses $L_3$ and $L_4$, which enclose the diaphragm and have a strong effect of overcorrection of image faults, and, on the other hand, with arrangement of the two outer surfaces ($R_8$ and $R_{10}$) in the two-lens rear member, which are concave relative to the diaphragm, have a strong collective effect and are the carriers of the collective effect of said rear member on the side of the minor conjugate.

According to the novel principle of the present invention said two negative refractive forces having a strong effect of overcorrection, are arranged on both sides of the diaphragm at a great distance from each other, in order to include relatively long paths of rays in their range of action, while in contrast to this arrangement, the subsequent collective refractive forces are arranged closely.

Thus, in the objectives embodying the present invention, the two outer collecting surfaces ($R_8$ and $R_{10}$) follow the large diaphragm space between surfaces $R_6$ and $R_7$, at a small distance.

It has been found that the mutual ratio of distances between these strongly refractive surfaces, if of decisive importance in attaining the object of the invention, so that these novel distance relations are characteristic in connection with the principle of the invention.

According to the invention, the length ($a_2$) of the diaphragm space, measured along the optical axis, i. e. the distance between the vertexes of surfaces $R_6$ and $R_7$ is selected in such manner that this value ($a_2$) is greater than 3.333 times the distance ($d_4$) between the vertexes of surfaces $R_7$ and $R_8$, likewise measured along the optical axis, i. e. the axial thickness $d_4$ of individual meniscus-shaped diverging lens $L_4$, so that the quotient of the vertex distance of tthe diaphragm space, divided by the axial thickness of the fourth lens ($L_4$) is greater than 3.333; simultaneously, said distance ($a_2$) of vertexes of the diaphragm space is selected in such manner that the product $$\frac{a_2}{d_4} \times \frac{a_2}{d_4 + a_3 + d_5}$$

is greater than 6.667, but does not exceed 33.33, wherein $a_3$ denotes the axial distance between the vertexes of surfaces $R_8$ and $R_9$ and $d_5$ denotes the axial distance between the vertexes of surfaces $R_9$ and $R_{10}$.

However, it has been also found that in carrying out the invention the value of quotient $$\frac{a_2}{d_4 + a_3 + d_5}$$

should not be smaller than 1.333 and should not exceed 6.667.

For the sake of brevity, the above mentioned quotients and their product should be denoted hereinafter as follows:

$$a_2 : d_4 = Q_1$$
$$a_2 : (d_4 + a_3 + d_5) = Q_2$$
$$Q_1 . Q_2 = Q_{12}$$

Using these symbols, the requirements of the invention are as follows:

Principal condition (A): $Q_1 > 3.333 \left(3.333 = \frac{40}{12}\right)$

Principal condition (B): $Q_{12} > 6.667 \left(6.667 = \frac{80}{12}\right)$

Principal condition (C): $Q_{12} < 33.33$ and, furthermore,

Secondary condition $(D_1)$: $Q_2 > 1.333$ $\left(1.333 = \frac{16}{12}\right)$

Secondary condition $(D_2)$: $Q_2 < 6.667$ $\left(6.667 = \frac{80}{12}\right)$

In objectives embodying the present invention, zonal apertural aberrations are appropriately affected in, as well as outside, the axis by the curvature of the objective lenses, like in objectives of other types. Therefore, suitable selection of the outer curvature of the total objective is of importance, and in this connection the experimental rule is followed that the algebraic sum of radii of curvature of opposite sign, of the two outer limiting surfaces of the total objective ($R_1$ and $R_{10}$) is not zero and the said sum has a positive value.

Research work done in connection with the present invention, has shown that—in contrast to previous experience—this curvature should be selected in a variable manner, depending on the derived maximum of light-transmitting capacity in order to attain the ideal object of the invention with as high a degree of approximation as possible. Thus, a connection exists thereby with the relative aperture (initial aperture) of the total objective. This can be expressed by the condition (E) $\quad \dfrac{2 \cdot R_1}{-R_{10 \cdot z}} > 1.167 \quad \left(1.167 = \dfrac{14}{12}\right)$ wherein the negative sign of $R_{10}$ indicates the negative sign of this surface and $z$ denotes the aperture number of the objective.

In connection with the zonal curvature of the lateral image shells within the extended field of vision, it has been found that the curvature ratio of the front lens relative to the outer curvature of the total objective is of pertinent importance. This curvature relation can be numerically characterized in simple manner by the quotient of the difference of radii of the front lens, divided by the sum of the outer radii of the total objective. This relation denoted by symbol $Q_3$ and corresponding to quotient $$\frac{R_2 - R_1}{R_1 + R_{10}} = Q_3$$

should be according to the invention in the range characterized by a lower limit of $+1.167$ and an upper limit of $+6.667$, i. e. meet the following conditions:

Condition (F): $Q_3 > 1.167$ $\left(1.167 = \dfrac{14}{12}\right)$

Condition (G): $Q_3 < 6.667$ $\left(6.667 = \dfrac{80}{12}\right)$

In carrying into effect the present invention the above outlined principle of construction is preferably applied to such lens combinations of the present novel variation of modified Gauss objectives, in which the individual lenses have designs corresponding to the ranges of radii of curvature in the following table, in which the symbols of the examples are used:

$$\text{I} \begin{cases} 0.45\,f < R_1 < 0.70\,f \\ 0.70\,f < R_2 < 7\,f \end{cases} L_1$$

$$\text{II} \begin{cases} 0.25\,f < R_3 < 0.50\,f \\ 0.50\,f < R_4 > -f \\ 0.50\,f < R_5 > -f \\ 0.15\,f < R_6 < 0.35\,f \end{cases} \begin{matrix} L_2 \\ \\ L_3 \end{matrix}$$

Diaphragm Space $$\text{III} \begin{cases} 0.15\,f < -R_7 < 0.35\,f \\ 0.25\,f < -R_8 < 0.50\,f \end{cases} L_4$$

$$\text{IV} \begin{cases} f < -R_9 > -3\,f \\ 0.25\,f < -R_{10} < 0.50\,f \end{cases} L_5$$

Thus, referred to the unit focal length $f = 100$ mm., the range of radii of curvature is as follows:

$R_1$ from 45.0 mm. to 70.0 mm. ⎤ I
$R_2$ from 70.0 mm. to 700 mm. ⎦

$R_3$ from 25.0 mm. to 50.0 mm. ⎤
$R_4$ from ⎥
and      50.0 mm. over ∞ to −100 mm. ⎥ II
$R_5$ ⎥
$R_6$ from 15.0 mm. to 35.0 mm. ⎦

Diaphragm Space $R_7$ from −15.0 mm. to −35.0 mm. ⎤ III
$R_8$ from −25.0 mm. to −50.0 mm. ⎦

$R_9$ from −100 mm. over ∞ to +300 mm. ⎤ IV
$R_{10}$ from −25.0 mm. to −50.0 mm. ⎦

The following numerical tables represent two examples of objectives according to the present invention, the symbols used in these tables corresponding to the symbols appearing in the drawings. Thus, the radii are denoted R; the axial thickness of the lenses $d$, and their axial distances from each other $a$; the members of the objective are denoted I to IV and the individual lenses $L_1$ to $L_5$. These structural elements, as well as the radii, thicknesses and distances, are consecutively numbered, starting on the side of the major conjugate, in the direction of the minor conjugate. The diaphragm is denoted B. The glasses used are characterized by their refractive numbers for the yellow light of the helium—$d$—line, while their color dispersion is characterized by the Abbe numbers $\nu$.

Both numerical examples refer to objectives of the f/2 class of light-transmitting capacity, whereby the relative aperture is 1:2.1, i. e. somewhat smaller in one example and 1:1.9, i. e. somewhat higher in the other example. Furthermore, the examples show that there is considerable freedom in selecting the glasses within the scope of the invention, so that several lenses can be made of equal glass types without loss in performance, and this means essential advantages in commercial production.

The effective image field of both objectives amounts to about 50°. The objectives of the examples are designed in such manner that in the composite negative member II preceding the diaphragm, a weak air lens, the axial thickness of which is denoted $l$, is arranged between individual lens elements $L_2$ and $L_3$. This air lens can be substituted, in known manner, by a weak glass lens, or by a common cemented surface. In this last mentioned case the somewhat different radii of curvature $R_4$ and $R_5$ must be adjusted to each other, as indicated in the above table of ranges of the radii of curvature. The introduction of such cemented surfaces instead of glass-air surfaces could be used in prior art systems for essentially improving the image characteristics of optical systems, by the elimination of disturbing reflexes. However, since the normal application of reflex-reducing layers on lens surfaces in optical systems, said structural modification has essentially lost its practical importance.

The objectives according to the present invention are illustrated true to size in the drawings for an equivalent focal length of $f = 150$ mm.

Numerical Example 1 (Fig. 1)

[f=1.000   1:2.1]

| | | | |
|---|---|---|---|
| $R_1 = +0.56869$ | $d_1 = 0.09265$ | $n_1 = 1.7440$ | $\nu_1 = 44.7$ |
| $R_2 = +1.14447$ | $a_1 = 0.03706$ | air | |
| $R_3 = +0.31689$ | $d_2 = 0.11313$ | $n_2 = 1.6910$ | $\nu_2 = 54.8$ |
| $R_4 = +0.84262$ | $l = 0.00488$ | air | |
| $R_5 = +0.99131$ | $d_3 = 0.03413$ | $n_3 = 1.7000$ | $\nu_3 = 30.3$ |
| $R_6 = +0.20529$ | $a_2 = 0.22431$ | air | diaphragm space |
| $R_7 = -0.22608$ | $d_4 = 0.02926$ | $n_4 = 1.7280$ | $\nu_4 = 28.3$ |
| $R_8 = -0.31689$ | $a_3 = 0.00146$ | air | |
| $R_9 = -5.91865$ | $d_5 = 0.07558$ | $n_5 = 1.6910$ | $\nu_5 = 54.8$ |
| $R_{10} = -0.35226$ | | | |

In the above example $$Q_1 = \frac{a_2}{d_4} = \frac{0.22431}{0.02926} = 7.666097$$

i. e. greater than 3.333 (in conformity with condition A)

$$Q_2 = \frac{a_2}{d_4 + a_3 + d_5} = \frac{0.22431}{0.10630} = 2.110160$$

i. e. greater than 1.333 (in conformity with condition $D_1$) and smaller than 6.667 (in conformity with condition $D_2$)

$$Q_{12} = Q_1 \cdot Q_2 = 7.666097 \times 2.110160 = 16.76691$$

i. e. greater than 6.667 (in conformity with condition B) and smaller than 33.33 (in conformity with condition C). Furthermore, $$2 \cdot R_1 = +1.13738$$
$$-R_{10} \cdot z = +0.35226 \times 2.10 = 0.739746$$

and thus $$\frac{1.13738}{0.739746} = 1.537528$$

i. e. greater than 1.167 (in conformity with condition E);

| | |
|---|---|
| $R_1 = +0.56869$ | $R_1 = +0.56869$ |
| $R_2 = +1.14447$ | $R_{10} = -0.35226$ |
| $R_2 - R_1 = +0.57578$ | $R_1 + R_{10} = +0.21643$ |

$$Q_3 = \frac{+0.57578}{+0.21643} = 2.660352$$

i. e. greater than 1.67 (in conformity with condition F) and smaller than 6.667 (in conformity with condition G).

Figure 2:
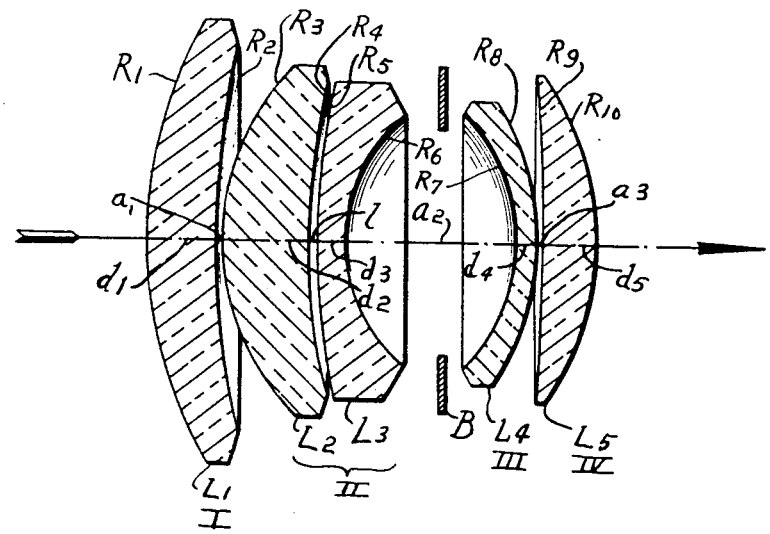
Figure 2 shows another form of the invention.

Numerical Example 2 (Figure 2)

[f=1.000   1:1.9]

| | | | |
|---|---|---|---|
| $R_1 = +0.55559$ | $d_1 = 0.092355$ | $n_1 = 1.72381$ | $\nu_1 = 38.0$ |
| $R_2 = +1.14082$ | $a_1 = 0.002430$ | air | |
| $R_3 = +0.31323$ | $d_2 = 0.112770$ | $n_2 = 1.69347$ | $\nu_2 = 53.5$ |
| $R_4 = +0.83994$ | $l = 0.004861$ | air | |
| $R_5 = +0.98816$ | $d_3 = 0.034025$ | $n_3 = 1.72755$ | $\nu_3 = 28.4$ |
| $R_6 = +0.20464$ | $a_2 = 0.223596$ | air | diaphragm space |
| $R_7 = -0.22536$ | $d_4 = 0.029165$ | $n_4 = 1.72755$ | $\nu_4 = 28.4$ |
| $R_8 = -0.31588$ | $a_3 = 0.001458$ | air | |
| $R_9 = -4.44012$ | $d_5 = 0.067565$ | $n_5 = 1.69347$ | $\nu_5 = 53.5$ |
| $R_{10} = -0.34444$ | | | |

In the above example $$Q_1 = \frac{a_2}{d_4} = \frac{0.223596}{0.029165} = 7.666587$$

i. e. greater than 3.333 (in conformity with condition A)

$$Q_2 = \frac{a_2}{d_4 + a_3 + d_5} = \frac{0.223596}{0.098188} = 2.277223$$

i. e. greater than 1.333 (in conformity with condition $D_1$) and smaller than 6.667 (in conformity with condition $D_2$)

$$Q_{12} = Q_1 \cdot Q_2 = 7.666587 \times 2.277223 = 17.458528$$

i. e. greater than 6.667 (in conformity with condition B) and smaller than 33.33 (in conformity with condition C). Furthermore, $$2 \cdot R_1 = +1.11118$$
$$-R_{10} \cdot z = +0.34444 \times 1.9 = +0.654436$$

and thus $$\frac{1.11118}{0.654436} = 1.697920$$

i. e. greater than 1.167 (in conformity with condition E)

| | |
|---|---|
| $R_1 = +0.55559$ | $R_1 = +0.55559$ |
| $R_2 = +1.14082$ | $R_{10} = -0.34444$ |
| $R_2 - R_1 = +0.58523$ | $R_1 + R_{10} = +0.21115$ |

$$Q_3 = \frac{+0.58523}{+0.21115} = 2.771632$$

i. e. greater than 1.167 (in conformity with condition F) and smaller than 6.667 (in conformity with condition G).

Figure 3:
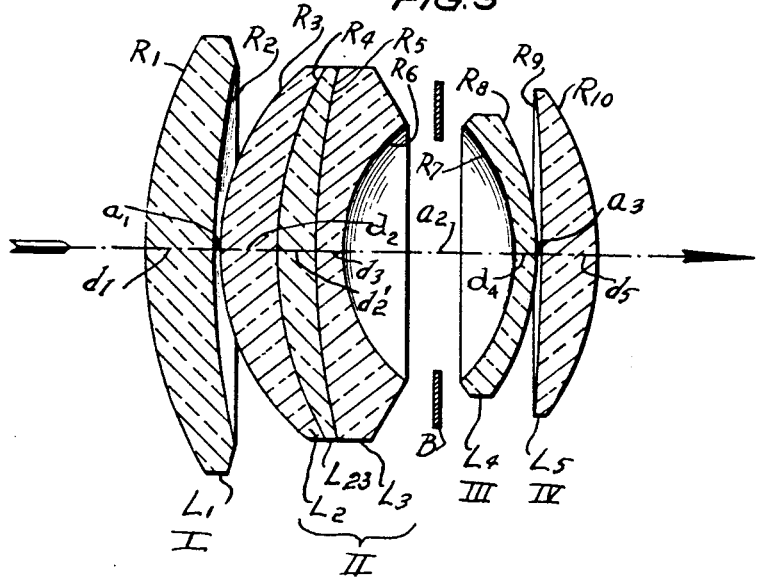
Figure 3 shows a modified form of the invention.

Figure 3 illustrates the beforementioned modification of the objective according to my invention, in which the weak air lens between individual lenses $L_2$ and $L_3$ of the composite, meniscus-shaped diverging member II shown in Figure 1, is substituted by a cemented in glass lens $L_{23}$ of likewise weak action. The further modification, likewise mentioned above, in which individual lenses $L_2$ and $L_3$ of member II arranged in front of the diaphragm, are united by a common cemented surface having lengths of radii $R_4 = R_5$, in order to avoid the double passage glass-air-glass, is not illustrated in the drawings.

It will be understood that this invention is not limited to the particular elements, designs figures and other details specifically described above and can be carried out with various modifications without departing from the scope of the invention as defined in the appended claims.

What is claimed is:

1. A four-membered photographic objective of high light-transmitting capacity, corrected spherically, chromatically, for coma and astigmatically, comprising two of said members arranged in front of the diaphragm on the side of the major conjugate in such manner that one member which is adjacent the major conjugate, convex relative to the same and of positive refractive power, is followed by a negative member composed of lenses of opposite power, said member having likewise the design of a meniscus of convex curvature relative to the major conjugate; two other members following the diaphragm on the side of the minor conjugate, and consisting of uncemented individual lenses, the first of these lenses, which limits the diaphragm space being designed as a meniscus-shaped diverging lens of concave curvature relative to the diaphragm space and followed by a collective lens of unequal curvature, which forms the last lens element of the total objective on the side of the minor conjugate; the refractive surfaces of these members being of such mutual arrangement and distribution, in the vicinity of the diaphragm space and in the direction toward the side of the minor conjugate, on the one hand of the characteristic diverging surfaces of strong refractive power, limiting the diaphragm space, and, on the other hand, of the subsequent characteristic collecting surfaces of strong refractive power, which are concave relative to the diaphragm space, that the objective meets the following conditions:

(A) $\quad Q_1 = \frac{a_2}{d_4} > 3.333$ (B) $\quad Q_1 \cdot Q_2 = \frac{a_2}{d_4} \cdot \frac{a_2}{d_4 + a_3 + d_5} > 6.667$ (C) $Q_1 \cdot Q_2 = \frac{a_2}{d_4} \cdot \frac{a_2}{d_4+a_3+d_5} < 33.33$ wherein $a_2$ stands for the distance between the vertexes of lens surfaces limiting the diaphragm space on the side of the major conjugate and minor conjugate, respectively; $a_3$ stands for the distance of vertexes of the outer lens surface of the meniscus-shaped diverging lens following the diaphragm space on the side of the minor conjugate and the inner lens surface of the last member in the direction of light, of the total objective, respectively; $d_4$ denotes the thickness of the lens element limiting the diaphragm space on the side of the minor conjugate and $d_5$ denotes the thickness of said last member of the total objective, said distances and thicknesses being measured along the optical axis and $$Q_2 = \frac{a_2}{d_4+a_3+d_5}$$

(D) $1.333 < Q_2 < 6.667$ wherein $Q_2$ has the meaning defined above;

(E) $2.333 > \frac{2 \cdot R_1}{-R_{10} \cdot z} > 1.167$ wherein $R_1$ and $R_{10}$ denote the radius of curvature of the outer limiting surface of the total objective on the side of the major conjugate and on the side of the minor conjugate, respectively and $z$ denotes the initial aperture number of the total objective, the individual lenses having designs corresponding to the following ranges of radii of curvature:

$$I \begin{cases} 0.45\,f < & R_1 < 0.70\,f \\ 0.70\,f < & R_2 < 7\,f \end{cases} L_1$$

$$II \begin{cases} 0.25\,f < & R_3 < 0.50\,f \\ 0.50\,f < & R_4 > -f \end{cases} L_2$$

$$\begin{cases} 0.50\,f < & R_5 > -f \\ 0.15\,f < & R_6 < 0.35\,f \end{cases} L_3$$

diaphragm space $$III \begin{cases} 0.15\,f < -R_7 < 0.35\,f \\ 0.25\,f < -R_8 < 0.50\,f \end{cases} L_4$$

$$IV \begin{cases} f < -R_9 > -3\,f \\ 0.25\,f < -R_{10} < 0.50\,f \end{cases} L_5$$

wherein $R_1$–$R_{10}$ denote the radii of curvature of the lens surfaces, $L_1$–$L_5$ denote the individual lens elements of the objective and $f$ stands for the equivalent focal lengths, the symbols being consecutively numbered in the direction of light.

2. Photographic objective as claimed in claim 1, in which the ratio of curvatures of the front lens relative to outer curvature of the total objective is selected in such manner that the objective meets the following condition:

$$1.167 < Q_3 = \frac{R_2 - R_1}{R_1 + R_{10}} < 6.667$$

wherein $R_1$ denotes the radius of the outer lens surface of the first lens, and $R_2$ denotes the radius of the inner lens surface of said first lens located on the side of the major conjugate and $R_{10}$ denotes the radius of curvature of the outer terminal lens surface of the total objective on the side of the minor conjugate.

3. Photographic objective as claimed in claim 1, in which a glass lens is substituted for the separating air lens, in the meniscus-shaped diverging member preceding the diaphragm, between the collecting lens and the subsequent diverging lens which form said meniscus-shaped member.

4. Photographic objective as claimed in claim 1, in which the meniscus-shaped diverging member preceding the diaphragm, the collecting lens and subsequent diverging lens which form said member, are united by a common cemented surface.

5. Photographic objective as claimed in claim 1, showing the following characteristics:

[F=1]

| | |
|---|---|
| $R_1 = +0.6$ | $d_1 = 0.09$ |
| $R_2 = +1.1$ | $a_1 = 0.03$ |
| $R_3 = +0.3$ | $d_2 = 0.11$ |
| $R_4 = +0.8$ | $l = 0.005$ |
| $R_5 = +1.0$ | $d_3 = 0.03$ |
| $R_6 = +0.2$ | $a_2 = 0.22$ |
| $R_7 = -0.2$ | $d_4 = 0.03$ |
| $R_8 = -0.3$ | $a_3 = 0.001$ |
| $R_9 = -5$ | $d_5 = 0.07$ |
| $R_{10} = -0.3$ | | wherein $R_1$–$R_{10}$ denote the radii of curvature of the lens surfaces, $a_1$–$a_3$ are the distances of vertexes of lens surfaces between members of the objective, $d_1$–$d_5$ are the thicknesses of the lens elements, and $l$ is the distance of vertexes of lens surfaces between the lens elements forming the meniscus-shaped diverging member preceding the diaphragm, all distances and thicknesses being measured along the optical axis and the symbols being consecutively numbered in the direction of light, and F stands for the equivalent focal length.

References Cited in the file of this patent

UNITED STATES PATENTS 2,106,077    Tronnier    Jan. 18, 1938

FOREIGN PATENTS 630,224    Germany    May 23, 1936
288,791    Switzerland    June 1, 1953
291,562    Switzerland    Sept. 16, 1953